UNITED STATES PATENT OFFICE.

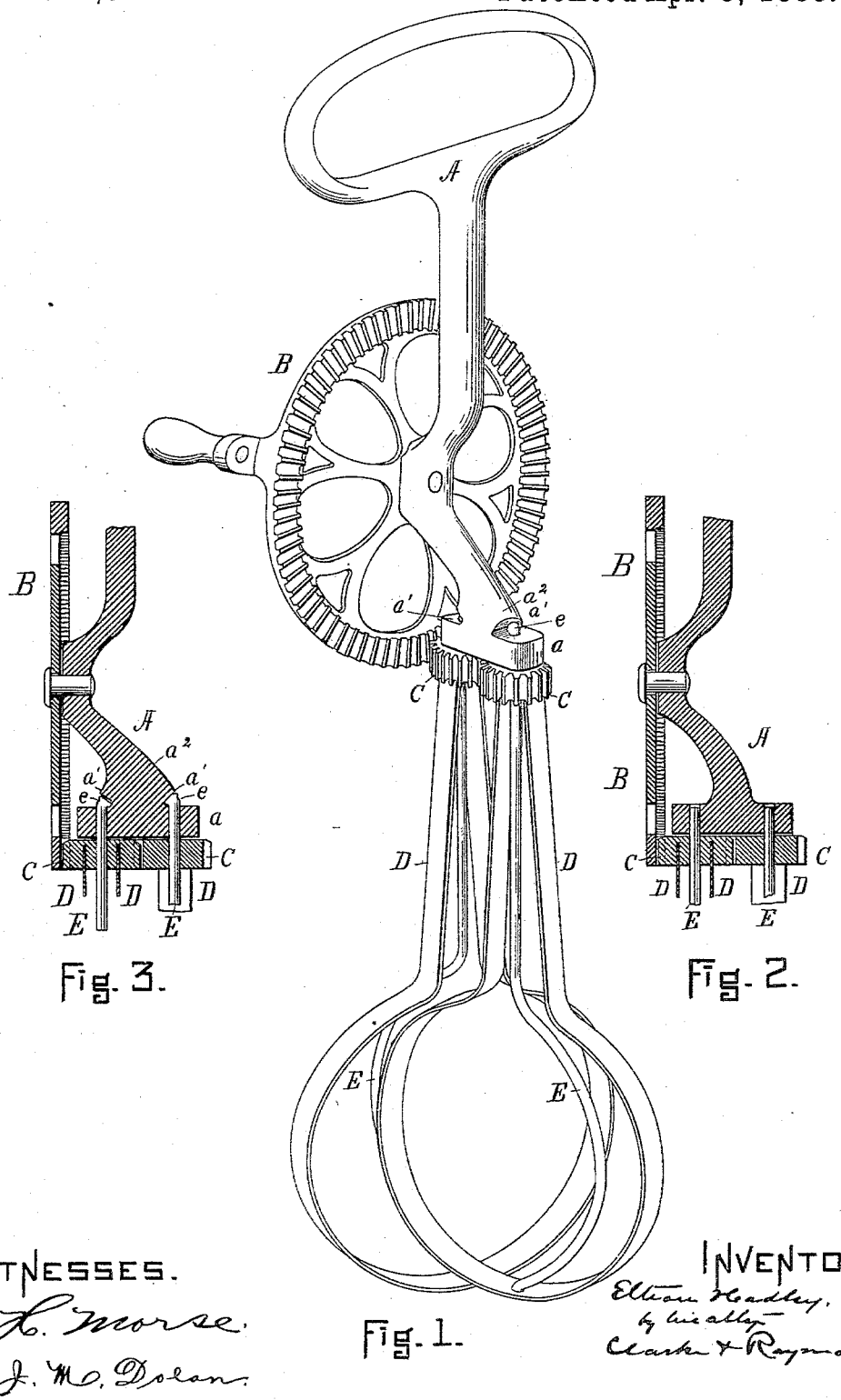

ETHAN HADLEY, OF CHICOPEE FALLS, ASSIGNOR TO THE DOVER STAMPING COMPANY, OF BOSTON, MASSACHUSETTS.

EGG-BEATER.

SPECIFICATION forming part of Letters Patent No. 380,564, dated April 3, 1888.

Application filed October 1, 1887. Serial No. 251,184. (No model.)

*To all whom it may concern:*

Be it known that I, ETHAN HADLEY, of Chicopee Falls, in the county of Hampden and State of Massachusetts, a citizen of the United States, have invented a new and useful Improvement in Egg-Beaters, of which the following is a full, clear, and exact description, reference being had to the accompanying drawings, forming a part of this specification, in explaining its nature.

There is a class of egg-beaters having revolving floats very common in the market, and having three or four varieties in a class, which are distinguished by having a handle at the top, a supporting-frame provided with a foot at the bottom, and beating-floats which revolve above the foot and below the handle, and are actuated by gearing mounted upon the shank of the handle or the side of the frame, and one variety of this class is provided with a pair of interlacing cutting-floats. This variety is called the "Dover Egg-Beater," and it is to this variety that the present invention is particularly applicable, although it can be employed in making the connection between the wire standard and handle of an egg-beater which does not have the interlacing beating-floats.

In the class of egg-beaters referred to the handle and shank of the handle are usually of cast-iron, and upon the side of the shank is mounted the driving cog-wheel. The lower part of the frame is usually made of round wire, which is connected with the cast-iron part referred to by friction merely, or by extending the wires upward and fastening them to the rivet or pivot on which the driving cog-wheel is mounted. This method of connection is not as firm as has been desirable, and it is to provide a firmer connection between the wire frame and the handle that the present improvement is devised.

In the drawings, Figure 1 represents a perspective of an egg-beater containing this improvement. Fig. 2 is a section of some of the working parts of the egg-beater as at present made. Fig. 3 is a similar section illustrating this improvement.

A is the handle, usually made of cast-iron. Upon its shank is mounted, on one side, the driving-wheel B. At the lower part of the shank there is a pair of flanges, $a$, which furnishes a proper point of attachment for the wires of the lower part of the frame of the egg-beater, which wires are marked in all the drawings E. Around these wires are mounted the pinions C, which carry the beating-floats D, which beating-floats are centered at the lower end upon the lower part of the wire frame E.

The improvement consists in a peculiar formation of the lower part of the shank of the handle A, and in connection therewith a peculiar method of upsetting the ends of the wires E, so that they are riveted and held from motion longitudinally in both directions. This is done by making the lower part, $a^2$, of the shank of the handle A larger than usual, whereby the shank of the handle wholly or partially covers the holes in the flanges $a$, provided for the insertion of the wires E, and by making a recess, $a'$, at the lower end of this enlarged portion of the shank and between it and the splay $a$.

The wires E are made slightly longer than has hitherto been the custom, so that they pass quite through the flanges $a$, and are upset into the recesses $a'$ by a lateral blow, whereby the upper ends of the wires E are brought in contact with a downwardly-presenting shoulder, and at the same time the end of the wire is riveted over the top of the flanges $a$. This upset portion of the wires E is lettered $e$ in Figs. 1 and 3.

I claim as my invention and desire to secure by Letters Patent of the United States—

The combination of a handle, A, provided at the lower end with flanges $a$, and having an enlargement at the lower end of its shank above the flanges sufficient to cover or partly cover the holes provided in the flanges $a$ for the insertion of the wires E, with said wires E restrained from longitudinal movement in either direction by means of the recess $a'$ between the enlargement $a^2$ and the flanges $a$ of the handle A, and an upset portion, $e$, of the wires E, in connection with the said wires, substantially as described.

ETHAN HADLEY.

Witnesses:
JAMES H. LOOMIS,
HENRY N. LYON.